US012116776B2

(12) United States Patent
Strimling

(10) Patent No.: US 12,116,776 B2
(45) Date of Patent: Oct. 15, 2024

(54) CELLULOSE-BASED INSULATION AND METHODS OF MAKING THE SAME

(71) Applicant: ULTRACELL INSULATION, LLC, Grand Island, NY (US)

(72) Inventor: Jonathan Strimling, Bedford, NH (US)

(73) Assignee: CLEANFIBER INC., Blasdell, NY (US)

( * ) Notice: Subject to any disclaimer, the term of this patent is extended or adjusted under 35 U.S.C. 154(b) by 1044 days.

(21) Appl. No.: 15/768,440

(22) PCT Filed: Oct. 15, 2016

(86) PCT No.: PCT/US2016/057249
§ 371 (c)(1),
(2) Date: Apr. 13, 2018

(87) PCT Pub. No.: WO2017/066728
PCT Pub. Date: Apr. 20, 2017

(65) Prior Publication Data
US 2018/0320367 A1 Nov. 8, 2018

Related U.S. Application Data

(60) Provisional application No. 62/242,645, filed on Oct. 16, 2015.

(51) Int. Cl.
*E04B 1/78* (2006.01)
*B27N 1/00* (2006.01)
(Continued)

(52) U.S. Cl.
CPC .................. *E04B 1/78* (2013.01); *B27N 1/00* (2013.01); *B27N 3/007* (2013.01); *B27N 3/04* (2013.01);
(Continued)

(58) Field of Classification Search
CPC .... E04B 1/94; E04B 2001/745; E04B 1/7658; D04D 7/06; B68G 1/00; B68G 1/05; Y02W 30/64
See application file for complete search history.

(56) References Cited

U.S. PATENT DOCUMENTS 1,721,594 A 7/1929 Hardinge
4,271,115 A 6/1981 Georgeau
(Continued)

FOREIGN PATENT DOCUMENTS

CN 101892057 11/2010
EP 0964093 A1 * 3/1999 .............. D04H 1/46
(Continued)

OTHER PUBLICATIONS

Deae-cellulose, PubChem, https://pubchem.ncbi.nlm.nih.gov/compound/CELLULOSE, retrieved Mar. 13, 2021.*
(Continued)

*Primary Examiner* — Jennifer A Gillett
(74) *Attorney, Agent, or Firm* — Caseiro Burke LLC; Chris A. Caseiro; Nicholas A. McCrillis

(57) ABSTRACT

A cellulose-based fire resistant insulation and related method for making the same. The insulation includes a plurality of superstructures that establish voids in the insulation. The insulation may be blown in place while the superstructures maintain the void portion of the insulation. The insulation is made with fiber residuals, either alone or in combination with other cellulosic materials. The method of making the insulation includes the steps of treating the cellulosic materials with a fire retardancy chemical or chemicals and creating bonds between the fibers to form the superstructures.

13 Claims, 6 Drawing Sheets

(51) Int. Cl.

| | |
|---|---|
| ***B27N 3/00*** | (2006.01) |
| ***B27N 3/04*** | (2006.01) |
| ***B27N 3/08*** | (2006.01) |
| ***B27N 3/12*** | (2006.01) |
| ***B27N 5/00*** | (2006.01) |
| ***B27N 9/00*** | (2006.01) |
| ***E04B 1/74*** | (2006.01) |
| ***E04B 1/76*** | (2006.01) |
| ***E04B 1/94*** | (2006.01) |
| ***E04C 2/16*** | (2006.01) |
| *B27N 1/02* | (2006.01) |

(52) U.S. Cl.

CPC ................. *B27N 3/08* (2013.01); *B27N 3/12* (2013.01); *B27N 5/00* (2013.01); *B27N 9/00* (2013.01); *E04B 1/7604* (2013.01); *E04B 1/941* (2013.01); *E04C 2/16* (2013.01); *B27N 1/02* (2013.01); *B27N 3/005* (2013.01); *E04B 2001/746* (2013.01)

(56) References Cited

U.S. PATENT DOCUMENTS

| | | | | |
|---|---|---|---|---|
| 4,474,846 | A | 10/1984 | Doerer et al. | |
| 4,552,616 | A | 11/1985 | Kauppi | |
| 5,080,964 | A * | 1/1992 | Tesch | D04H 1/4266 442/353 |
| 5,112,684 | A | 5/1992 | Halm et al. | |
| 5,218,740 | A * | 6/1993 | Snyder | D04H 1/02 19/66 R |
| 5,516,580 | A | 5/1996 | Frenette et al. | |
| 5,593,625 | A | 1/1997 | Riebel et al. | |
| 5,910,367 | A * | 6/1999 | Kean | E04B 1/76 428/393 |
| 6,329,052 | B1 | 12/2001 | Groh et al. | |
| 7,261,936 | B2 * | 8/2007 | Davis | B68G 1/00 428/91 |
| 7,790,639 | B2 * | 9/2010 | Davenport | D04H 1/4266 428/221 |
| 8,043,384 | B2 | 10/2011 | Gagnon et al. | |
| 2007/0137805 | A1 | 6/2007 | Gerber et al. | |
| 2007/0148426 | A1 * | 6/2007 | Davenport | D04H 1/43838 428/292.1 |
| 2008/0003431 | A1 * | 1/2008 | Fellinger | E04B 1/7604 428/375 |
| 2008/0073044 | A1 * | 3/2008 | Bowman | D21B 1/32 162/28 |
| 2011/0023252 | A1 | 2/2011 | Kann | |
| 2011/0253325 | A1 * | 10/2011 | Cavaleri | D21B 1/08 162/4 |
| 2014/0206796 | A1 * | 7/2014 | Allampalayam Jayaraman | D04H 1/04 524/21 |

FOREIGN PATENT DOCUMENTS

| | | | | |
|---|---|---|---|---|
| EP | 1262293 | | 12/2002 | |
| EP | 2568001 | A1 * | 3/2013 | A01G 18/00 |
| JP | H11151707 | | 6/1999 | |
| WO | 9216785 | | 10/1992 | |
| WO | 6513900 | | 11/2000 | |
| WO | WO-2004008897 | A1 * | 1/2004 | A41G 11/00 |

OTHER PUBLICATIONS

International Search Report and Written Opinion for corresponding PCT application No. PCT/US2016/057249, Jan. 6, 2017, 8 pp.

Brazil preliminary search report for corresponding patent application in Brazil, Mar. 12, 2020, 4 pp.

China first office action for corresponding application in China, Dec. 18, 2019, with translation, 11 pp.

Eurasia Patent Office first office action for corresponding application in Eurasia Patent Office , Jul. 17, 2019, with translation, 6 pp.

European Patent Office extended search report for corresponding application in European Patent Office, Jan. 3, 2019, 12 pp.

International Search Report and Written Opinion in related PCT application PCT/US2018/063244, Jun. 24, 2019, 9 pp.

Office action (in English) for corresponding patent application in Japan, Mar. 31, 2021, 6 pp.

* cited by examiner

CELLULOSE-BASED INSULATION AND METHODS OF MAKING THE SAME

BACKGROUND OF THE INVENTION

1. Field of the Invention

The present invention relates to insulation and methods of making the same. More particularly, the present invention relates to insulation made of cellulosic components and including superstructures to enhance the heat flow reduction characteristics of the insulation including insulation that is blown, injected or sprayed into place.

2. Description of the Prior Art

Insulation is widely used for the purpose of passive thermal control in a broad range of applications, with building insulation being a particularly substantial application. Inorganic fiberglass has been the most common type of material used to make insulation. Cellulose insulation is an alternative form of insulation which provides for improved thermal performance by reducing convection and air permeability. Formed-in-place insulation made of polymeric materials (also known as spray foam) are costlier than insulation made of fiberglass or cellulosic materials but can provide the highest thermal resistance (or R-values).

Fiberglass insulation may be provided in batt or in-situ (blown into place) fiber form, with the thickness and the density of the batts and the blown fiber fill determinative of its thermal performance. Cellulose insulation is normally blown into attics, dense packed into cavities, or spray-applied into open wall cavities with water. It is desirable for performance and coverage purposes to be able to blow insulation into place. Blown insulation may either be as blown loose fill (such as in an open attic installation) or in a dense-packed application, as is normally the case in walls, where the material is forced into a cavity at a higher density. When blown insulation is installed, it is desirable to maintain the proper density of the insulation after installation to achieve the optimal insulative characteristics. At too low densities, the insulation can settle and air flow can reduce the effectiveness of the insulation; at too high densities, the insulation's thermal efficiency is reduced, and the cost of an installation increased.

Concerns beyond the effective performance of blown fiberglass relate to its limited fire retardant characteristics and environmental characteristics, which are now regulated under the Federal National Toxicological standards, have raised public and governmental concerns over its continued use as a thermal insulation product. Organic cellulosic insulation has been considered as an alternative to fiberglass and can be desirable for that purpose, particularly in regard to its environmental suitability and thermal efficiency. Currently, cellulosic insulation is made from recycled feedstock, with recycled newsprint being the primary feedstock. Other types of materials have been considered in order to increase the volume of available feedstock, such as cardboard, wood construction debris and the like.

Cellulose insulation is made in part using existing paper-making machinery and methods. Specifically, cellulose feedstock in the form of used paper, ordinarily in the form of printed newspaper, is mechanically reduced into small pieces and can include cellulosic fibers. In order to ensure that the cellulosic insulation conforms to fire retardant standards, the pieces are mixed or coated with a fire retardant chemical, which is usually a chemical in powder (i.e., solid) form that adhere to the cellulosic pieces. The chemicals used are selected from borates (which includes any compound or mixture containing boron such as, for example, boric acid and borax), ammonium sulfate, magnesium sulfate or an amalgamation of these materials (which will be referred to herein as fire retardants). The treated pieces are then fluffed to reduce its overall bulk density and improve its suitability for application. The treated pieces are bagged and then installed in place as blown-in insulation.

Paper mills have residual fibers referred to herein as Short Fiber Residuals ("SFR"), which are a by-product of the production of paper. These shorter fibers are not suitable for use in containerboard production or in the production of other paper, tissue, or related materials and result in a significant waste stream for production mills. Because there are not sufficient commercial uses for this material, it is often landfilled.

More generally, there are other potential sources of fiber residuals other than paper mills. Agricultural and wood-based processes often have fiber by-products that may not be useful in the production of food or other agriculturally or forestry-derived products. Finally, fiber residuals may be obtained from the production of cellulose insulation itself, where any loose, light, small or fine fibers may be removed from a cellulose insulation production line before packaging, to avoid excessive dustiness upon delivery to a cellulose insulation installer. Any of these processes that produce excess fine fibers of low economic value, which are more generally referred to below as fiber residuals.

Others have tried unsuccessfully to utilize SFR or fiber residuals in the production of cellulose insulation, but it is challenging to make these materials usable as cellulose insulation using conventional processes. The short fibers become airborne when blown reducing installer visibility and do not function as an effective insulation because they compress under their own weight, forming a highly dense bulk material that does not trap air or function effectively as an insulator. It would be useful to be able to use such material in a cellulosic insulation.

In addition to achieving the required retention of fire retardant material, it is essential for the finished product to achieve the required density. Cellulose insulation must fall in a narrow range of settled density: if it is not dense enough, its thermal performance may suffer, and if it is too dense, it effectively becomes cost prohibitive. If installed at too low of a density, the product can settle over time, the industry normally tests for settled density. Settling is undesirable and the strength, length and structure of the fibers in the insulation is a critical parameter that affects settling.

The conventional process for fabricating cellulose insulation from fibers involves making the insulation from recycled paper. The paper has the benefit that the fibers in the paper have been compressed into a mat, which gives the paper greater strength and rigidity than a collection of loose fibers. These factors contribute to conventional cellulose insulation meeting the required settled density levels.

However, with SFR as a feedstock for cellulose insulation, there is no intrinsic mat in the product. The shorter fibers are separate and therefore weaker, so that a pure SFR product may be unacceptably dusty, settle excessively, and fail to meet industry expectations for settled density. In theory, the SFR could be fabricated into a paper product using traditional paper-processing methodologies and then shredded to make a low density cellulose insulation comparable to existing products. There are multiple problems with this approach, however, which make it cost-prohibitive. Specifically, to make paper, one needs a pulp solution with approximately 98% water to be fed onto a felt, with the fibers then passed between heated rollers to dry the material. So this would result in the requirement to add substantial amounts of water to the SFR, which means that process water systems and significant capital and operating expenses would be required. In addition, it is difficult to make paper from SFR or other fiber residuals, because of the short length of the fibers and the difficulty in obtaining sufficient hydrogen bonding along the lengths of the fibers during the papermaking process.

Cellulose insulation must meet stringent requirements for health, safety, fire resistance, settled density and other regulated requirements such as ASTM C739. In addition, cellulose insulation must be competitively priced in order to be accepted by the market, which places stringent cost requirements on manufacturers. It is desirable to use cost-effective materials that can also be suitably treated for fire retardancy, installed in-situ and that have insulation characteristics that are at least as good as the insulation characteristics of fiberglass insulation, particularly blown-in fiberglass insulation.

Therefore, what is needed is insulation material made of relatively inexpensive cellulosic material including, but not limited to, SFR and other fiber residuals. What is also needed is such an insulation material that is fire retardant and that can be blown in place while maintaining desirable insulation characteristics along with acceptable settled density. Further, what is needed is a method for making such an insulation material.

SUMMARY OF THE INVENTION

It is an object of the present invention to provide an insulation material made of relatively inexpensive cellulosic material including, but not limited to, SFR and other fiber residuals. It is also an object of the invention to provide such an insulation material that is fire retardant and that can be blown in place while maintaining desirable insulation characteristics along with acceptable settled density. In addition, it is an object of the invention to provide a method for making such an insulation material.

These and other objects are achieved with the present invention, which is a cellulose-based insulation that may be blown in place while maintaining desired insulation characteristics and, maintains a desired settled density. The feedstock for the present invention is SFR that can be obtained from pulp processing operations. The SFR material may be used alone or in combination with other cellulosic materials including, but not limited to, alternate fiber sources, obtained from other sources, such as recycled paper or corrugated cardboard. When pulp mills make paper pulp from fiber feedstocks, SFR is created. These SFR materials contain fibers too short to be useful in paper processing, but fibers that may be useful in the production of cellulose insulation. The present invention modifies SFR to enable such usage and thereby produces a new insulation material.

The use of SFR materials for cellulose insulation solves two problems. For the pulp industry, it eliminates a waste stream that otherwise would need to be landfilled or trucked to a disposal site. For the cellulose industry, SFR materials provide a cost-effective feedstock that eliminates the need to purchase more expensive feedstock supplies. In addition, the utilization of SFR materials in a wet state (prior to drying the SFR materials after they are eliminated as waste from a pulping operation) is of use in treating the SFR with the fire retardants described herein. This is because the treatment of the SFR with the fire retardant is more effective when the SFR is wet, since the fire retardant can be carried into the fibers through the wicking action of the cellulose fibers. Less fire retardant material is required to make the insulation formed with SFR sufficiently fire retardant, thereby lowering the manufacturing cost for the insulation. Moreover, from an installation health and safety standpoint, wet fabrication reduces airborne chemical dust because the SFR is impregnated with the fire retardant, rather than adhered to the outside of the fibers. The infusing of the fire retardants directly into the fibers (instead of adhering dust externally to the fibers) also eliminates the risk that powders will be blown free during installation, which typically end up as dust in the installation of conventional cellulose insulation, and which reduce the visibility of the installer.

Several researchers and companies have attempted to manufacture cellulose insulation from SFR and have been unsuccessful in achieving the required physical properties. Cellulose and fiberglass insulations normally provide resistance to the flow of heat by trapping small volumes of air in pockets between fibers. Each little cavity of trapped air serves as a small insulator, and the smaller the voids are that are trapped in a material, the better the insulation will perform. In prior attempts to make insulation from SFR, the short fibers tended to pack densely, filling air voids and creating a higher-than-desired density product. The insulation values were not satisfactory (in terms of R-value) and the high density would have required an excessive mass of material to cover a given area. So for these reasons, SFR has previously not been usable in the production of cellulose insulation.

In addition, fire resistance is normally imparted upon cellulose fibers in cellulose insulation by treating the fibers with a dry chemical fire retardant. The dry chemical fire retardant must be adhered to the fibers using some sort of an agent, and mineral oil is normally utilized for this purpose. The mineral oil causes the fine powder of the dry fire retardant to adhere to cellulose fibers. But in attempting to utilize this process with SFR, the extremely high surface area of the fine fibers presents a problem. To adequately cover the fibers with mineral oil and dry dust fire retardant would require an excessive quantity of fire retardant powder. These two components add both cost and mass to the resulting product and the added mass weighs down the weak short fibers, further increasing density and decreasing its performance as an insulator.

Finally, there is a problem with SFR in the finished product that when installers blow cellulose into place, the fine, short fibers of the SFR become airborne dust. Because these fibers are both short and light, they stay suspended in the air for a long time. This dust is an irritant to installers and can irritate their eyes or respiratory systems.

The present invention overcomes the deficiencies described above regarding the use of SFR as an insulative material by forming what are referred to herein as superstructures of components such as cellulosic pieces such as cellulosic fibers including SFR fibers. The superstructures are formed as described herein to create clusters of fibers that are fixedly joined together to form three-dimensional bodies. The three-dimensional bodies may be in the form of tubes, sheets, woven mats, stars or other three-dimensional configurations and any combinations thereof. These superstructures contain voids and thereby establish voids in the bulk insulation containing them that results in an insulation having lower density than an insulation having more closely packed components. Further, the cellulosic fiber superstructures of the present insulation are of sufficient structural integrity that when a force is applied to the insulation, such as by blown-in-place installation or packing in a bag, such force does not fully collapse the superstructures. The result is that the insulation throughout its usage maintains relatively low bulk density of the insulation in comparison to settled bulk density and packed bulk density increases that occur with existing fiber-based insulative materials. In addition, these formed superstructures reduce the issues of dust faced by installers by forming larger and heavier structures, which are less likely to be suspended in the air as individual short fibers.

The use of SFR as a moist feedstock has several benefits in addition to the material cost savings. The first is reducing the total energy requirements of producing cellulose insulation, because electrical energy is not required for pulping and separation of the fibers. The second benefit is that the moist fibers do not require the addition of process water to the production facility. The addition of a fire retardant solution to pre-moistened fibers is advantageous because the moisture already in the fibers helps the fire retardant chemical to diffuse into the fibers and eliminates the use of excess water to thoroughly saturate the fibers. This is important because any facility that handles process water also requires the expense of water supply and handling issues with water effluent permits. The use of a moist material also substantially reduces the capital cost of a production facility (and hence the cost of the finished product). With moist material, no pulping equipment is required and the building footprint can be substantially smaller.

While the use of SFR as the feedstock of the insulation material of the present invention is desirable, other cellulosic recycle feedstocks may be used instead of or in addition to SFR. These other feedstocks include, but are not limited to, Old Corrugated Container (OCC), Old Newsprint (ONP), Double Lined Kraft (DLK), and various other grades of fiber that may be readily procured in the open market.

One of the challenges of making cellulose insulation from SFR is that the fiber length with SFR is significantly shorter than with OCC. In addition, single fibers do not have significant strength, and that strength is important in the finished cellulose product for maintaining a low density as the product settles over time. Accordingly, formation of the SFR into a superstructure is advantageous as part of the process to produce a cellulose-based insulation with the desired attributes of strength, targeted density and affordable cost. The superstructure is a binding together of fibers, which has two benefits: (1) giving the insulation greater strength than it would have when the fibers are not so fixedly joined together, and (2) creating voids in the material that resist compression and decrease the density of the bulk materials. These advantages allow the present invention to achieve lower settled densities with SFR than can be achieved using conventional processing methods for producing cellulose insulation.

This formation of cellulose superstructures may be achieved by multiple means. The bonding between fibers may be achieved through a separate binding agent, or through a chemical bond between fibers, such as hydrogen bonding between adjacent fibers. The formation of superstructures may be enhanced using heat, pressure, additives or a combination of all three. In an embodiment of this invention, it may be advantageous to press fibers between rollers while moist and heat may be added to enhance the pressing action. In another embodiment of this invention, a porous conveyor may be utilized to gather the SFR, and heat may be applied to facilitate both drying and the binding of fibers together, which may occur with or without a separate binding agent. Either heat or pressure or both heat and pressure may be advantageous in binding fibers together into the three-dimensional structures that are advantageous as noted above.

The superstructures may also be formed by rollers that have a specific contour, such as rollers with sharp contact points and then gaps between them, in order to create a textured composition. The benefit of a textured superstructure composition is that some parts of the material are densified, while others are not, leaving a desired overall density and superstructure configuration for subsequent processing. As an example, the textured composition may be configured as a superstructure with the pieces formed into relatively small clusters, with a compacted core and then several protruding fibers (somewhat in the form of a porcupine), with the "body" being compressed and then fibers protruding in multiple directions. The benefit of this type of a superstructure configuration provides a lower overall settled density, due to the "body" holding these small clusters together, with the "quills" effectively separating the clusters from one another.

The superstructure may also be formed by laying the fiber on a porous conveyor and exhausting or drying out the water, allowing the fibers to dry into a matted form. The matted form may be chopped or reduced into smaller size pieces after the formation of the mat.

Alternatively, the superstructures may be formed by utilizing a binding agent such as a resin, a sizing agent, chemical reagents, or any other means of adhering fibers together, which can join loosely adjacent fibers together in a fixed way to form the three-dimensional bodies as described herein so that they cannot settle upon later processing or usage. The superstructures establish voids that are air-filled so as to enhance insulative characteristics of the insulation.

In order to function most effectively, these superstructures may be produced with a void fraction (within the superstructure) of at least 30%. Enough of these clusters are contained in the insulation so that the overall void content of the insulation is at least 30%. It should also be noted that all of the methods described in this paragraph could apply equally well to SFR or a mix of SFR with other fibers, such as fibers from ONP, OCC, DLK or other material grades.

It should be understood that the process of forming the superstructures may results in the creation of macro-structures larger than the intended size of the ultimate superstructures. For example, the application of a binding or adherent agent may create a broad mat of product, which then may be size-reduced to form superstructures of the intended size, shape and densities.

The process of making the cellulose-based insulation of the present invention may be accomplished using a system that includes, without limitation, components such as one or more dewatering devices, one or more water recovery and return devices, optional fiber dye and/or bleaching devices, one or more dryers, dust collectors, coolers, fiberizers, product collectors and all conduits required to transfer material among the devices of the system. The system may be substantially incorporated into a conventional pulp and fiber manufacturing process of the type typically used in the papermaking industry, for example, rather than a completely distinct or an extensive add-on to a conventional process. An example of particular components of the system will be described herein, a number of which exist in the conventional pulp/paper processing facilities that currently exist.

The system and related method of the present invention provide an effective and cost competitive way to manufacture a viable cellulose-based insulation product. The system and method may include the use of a combination of feedstocks, including SFR, ONP and OCC feedstocks, to ensure an adequate and sustainable supply of feedstock. The system and method may also include the introduction of the chemical treatment prior to a drying stage, if any, of the manufacturing process. This results in a more effective attachment or impregnations of the fire retardant chemical with the insulation fibers while also reducing the amount of treatment to be used to produce effective fire retardancy.

The present invention enables the manufacture of fire retardant materials. The feedstock used to make the fire retardant material may be SFR alone, or SFR in combination with recycled materials, including, without limitation OCC, DLK, ONP or other residual cellulosic materials and combinations thereof. The invention provides for the combining of a fire retardancy chemical with the feedstock prior to drying of the combination. The fire retardancy chemical may be in liquid form when combined with the feedstock. Alternatively, the fire retardancy chemicals may be added in dry form, as providing that the material is moist, the chemicals may be wicked into the fibers by the moisture present in the fibers. The combination of fire retardancy chemical and the feedstock may be further processed to form a web, a sheet, a plurality of fibers, or other suitable form. The feedstock and fire retardancy combination may be further processed to make insulation, as noted, or other end products wherein fire retardancy is a desirable feature. When multiple fiber streams are utilized, the fire retardant materials may be separately applied to the separate fiber streams, to impart a different level of fire retardancy on each of the fiber types. Alternatively, the fire retardancy chemicals may be applied to only one material stream, for example either the moist SFR or other dry fiber sources, and the mixing of the materials together in a moist state may provide enough transport to allow for the entire mixture to be effectively treated with the fire retardant.

These and other advantages of the present invention will be recognized by those of skill in the art in view of the following detailed description, the accompanying drawings and the appended claims.

DETAILED DESCRIPTION OF THE PREFERRED EMBODIMENTS

Figure 1:
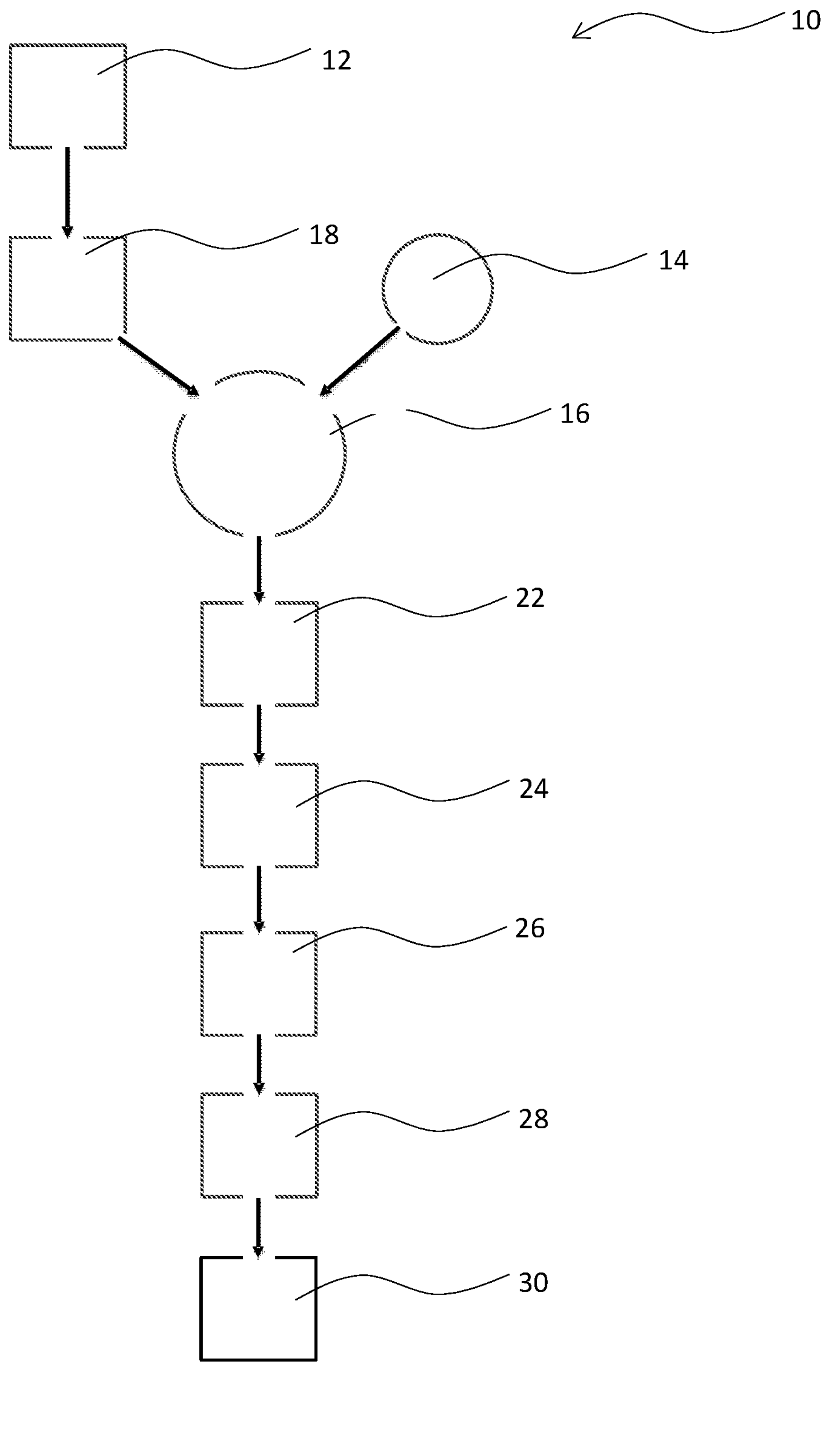
FIG. 1 is a simplified representation of an example system that can be used to make the cellulose-based insulation of the present invention.
Figure 2:
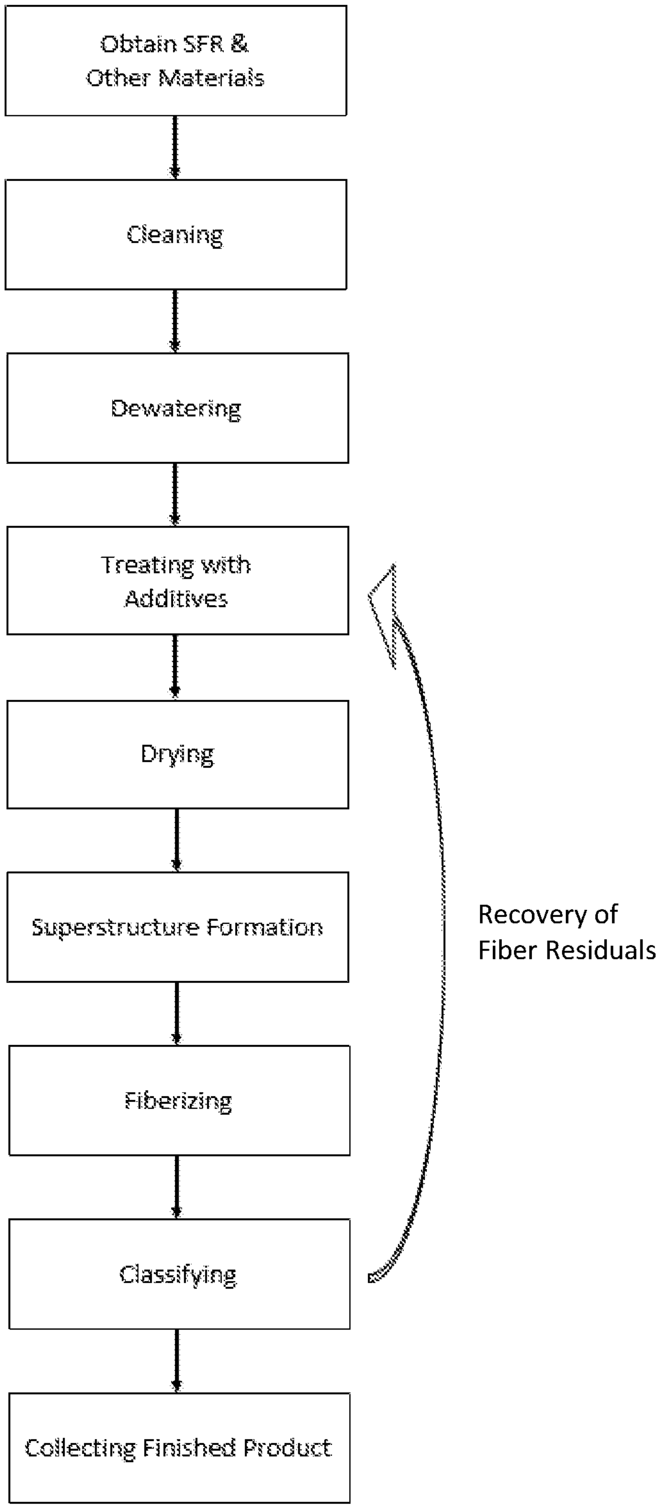
FIG. 2 is a block diagram representation of primary steps of a process that can be used to make the cellulose insulation of the present invention.
Figure 5:
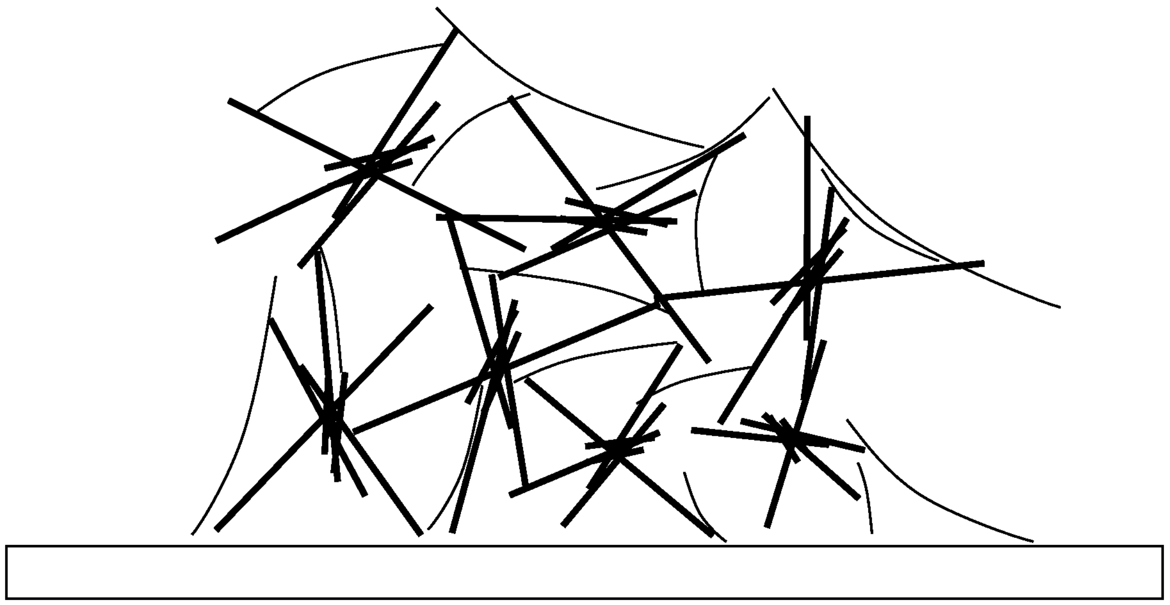
FIG. 5 shows how the presence of superstructures as part of the insulation of the present invention can cause other individual fibers to drape over the superstructures, rather than settling into a compressed orientation.

FIG. 1 illustrates a simplified representation of primary components of a system 10 used to make a cellulose-based insulation with fire retardancy of the present invention, which insulation is represented in FIG. 5. The insulation of the present invention includes superstructure constructs of the feedstock materials used to make it, which superstructures enhance the void features and, therefore, improving the thermal performance characteristics of the insulation. The insulation may be installed in place, such as by blowing or spraying it in place, while maintaining the integrity of the superstructures and thereby maintaining the void integrity of the insulation after installation. Primary steps of a process for making a cellulose-based insulation of the present invention are represented in FIG. 2.

The system 10 may be configured as shown in FIG. 1 and include a feedstock source container 12, a chemical treatment source 14, which may be a holding tank or any other source of additive, a blend tank 16, a dewatering unit 18, a drying unit 22, a superstructure formation unit 24, a fiberizing unit 26, a classifying unit 28, and a collection unit 30. The feedstock source container 12 is filled with cleaned feedstock material such as one or more of the cellulose-based recycled materials described herein. The feedstock may be moved manually or automatically into a dewatering unit 18 and then into the blend tank 16. It should be understood that the dewatering unit 18 may be located before or after the blend tank 16 where the fire retardant chemicals and other additives may be added. It is to be understood that the blend tank 16 is a representation of a structure within which the feedstock and any chemical additives of interest may be combined. Further, the blend tank 16 represents one or more such tanks within which feedstock and additives are combined. Heat may be applied in the blend tank to enhance the absorption of the fire retardant into the fibers.

The feedstock used to form the cellulose-based insulation of the present invention is a plurality of pieces including fibers but not limited thereto, of SFR or other fiber residuals. These materials may be processed alone, or may be interspersed with other materials, such as other recyclable cellulosic materials including, but not limited to, OCC and ONP, and added to the blend tank 16 containing desired additives, which may include water as noted.

The chemical treatment source 14 includes a liquid or suspension of treatment material, which may be a combination of a fire retardancy chemical water, and any other additives that may be of interest. The fire retardancy material may be in liquid form rather than powder form prior to delivery to the blend tank 16, but it should be understood that it may also be possible to add dry fire retardants directly into the blend tank 16, where they can be dissolved by the moisture present in the blend tank 16, thereby removing the need for a source tank 14 that includes additives in liquid form. The fire retardancy material may be a borate (such as boric acid, borax, or other borates), a combination of borates, magnesium sulfate, or a combination of one or more borates and magnesium sulfate. The use of magnesium sulfate reduces the overall cost of the insulation. Whereas prior uses of magnesium sulfate and/or borates as fire retardancy additive has been limited to application of such additives in powder form, the present invention in a liquid process, such as by adding that combination to the blend tank 16 either in liquid form or in powder form, for interaction with wet fibers improves the adhesion of that fire retardancy combination as compared to a dry mixing of the combination and the fibers. It is to be understood that other suitable fire retardancy chemicals may be employed. An aspect of the invention is that the fire retardancy chemical is combined with the feedstock in the presence of moisture levels in excess of 20% so as to provide effective penetration of the fire retardant into the fiber structure of the feedstock component from the feedstock source container 12.

Another additive of the chemical treatment source that may be of interest and used in the feedstock treatment process is a chemical, biological or other additive to eliminate or reduce one or more components of the feedstock that may result in a product with undesirable characteristics. For example, a cellulosic feedstock that is a recycled material may include one or more bonding agents comprising polysaccharides, starches and the like that, if carried through to the end product, may facilitate mold growth. An additive such as an enzyme or other component to break down such undesirable components, and/or make them sufficiently fluidized that they can be removed from the treated feedstock, may be added to the blend tank 16 as an aspect of the present invention.

Another additive of the chemical treatment source that may be of interest and used in the feedstock treatment process is an adhesive, resin, or a chemical, biological, or other additive designed to enhance the bonding between fibers, which may help to subsequently form or strengthen superstructures that may be formed during subsequent processing steps. These additives or treatments may also be added downstream of the blend tank, for example by being sprayed onto the material during or after the drying process.

The superstructure formation unit 24 may be positioned after the dryer in order to promote the formation of superstructures. These superstructures may be formed by any of the methods described above, through any means of gathering fibers together and then promotion the agglomeration of fibers together into superstructures that include fibers that are permanently adhered to one another. This may occur in combination with heat, pressure, or the addition of binding agents. It should also be noted the that formation of these bonds between fibers may also be effected within the blend tank or the drying step, so that a separate superstructure formation system may not be required.

The fiberizing unit 26 may be utilized to create a finer fiber structure. If superstructures have been formed that are larger than are desirable in the finished product, the fiberizer may be effective in limiting the size of such superstructures. In addition, if large particles have come through the process from prior steps, such as larger pieces of recycled paper, the fiberizer may also reduce the size of those materials, which may improve the density of the finished process.

It should also be understood that the formation of superstructures may also be accomplished after the fiberizing step, and not before, if that provides the optimal combination of fiber and superstructure geometry that is desired for a particular application. It should also be understood that an additive to promote binding of fibers into superstructures may be added upstream or downstream of the fiberizer. Finally, it should be understood that some portion of any feedstock stream may pass through a portion of the aforementioned steps, while another portion of the feedstock stream may bypass certain sections, with the critical aspect of this invention being that at least 5% of the materials are formed into superstructures as described above.

With reference to FIG. 2, the primary steps used in the process to make the insulation of the present invention are as follows. The process is summarized in the following primary steps that can be used to produce the insulation of the present invention: (a) obtaining and providing SFR feedstock materials, alone or in combination with other cellulosic materials, (b) cleaning the SFR feedstock materials (and any additional feedstock materials), (c) dewatering the treated feedstock materials, (d) treating the cleaned materials with fire retardant chemical additive and/or other additives, (e) drying the resultant materials, (f) creating bonds between fibers of the feedstock materials to form a plurality of superstructures, (g) fiberizing the dried materials including superstructures therein, (h) classifying the fiberized materials and (i) collecting and bagging the finished product. It should be understood that some of the steps may be adjusted or used in a different order. In addition, the cleaning step, for example, is not required in order to achieve the formation of the superstructures. Further, additional processing steps, such as fluffing the material prior to drying may be advantageous, if they promote the effectiveness of subsequent processing steps.

SFR feedstock materials may be obtained from pulping operations in an aqueous state and then may be dewatered to bring the moisture content of the material to approximately 25% to 75%.

The SFR and other feedstock materials may be treated with a fire retardant material in the blend tank 16 such as by utilizing an aqueous solution containing a blend of chemicals of the type described herein at an elevated temperature for an established dwell time, to allow the fire retardancy chemicals to saturate the feedstock material. The moisture of the SFR may also be sufficient at this stage to allow that dry chemicals are added to the blend tank, providing that there is sufficient moisture present to dissolve a substantial portion of the chemicals added to the blend tank, such that a substantial portion of the chemicals are infused into the fiber structure of the cellulose. This treatment may take place together with other feedstock materials as noted, the SFR may be treated separately from the other feedstocks, or only one of the feedstock streams may be treated with a fire retardant.

The SFR materials and other blended feedstock materials, if any, may be dewatered in the dewatering unit 18 using any means of technologies known to those of skill in the art, such as a press or a screen to separate the fibers from water. Aqueous solutions that are removed from the materials during the dewatering step may be reintroduced into a subsequent batch of product or reintroduced at the stage of aqueous treatment in a continuous process. This reuse of fluids is useful in making the overall process economical, as the fire retardant chemicals are far more expensive than the cellulosic fiber materials and would otherwise render the process uneconomical.

The treated and dewatered materials may be fluffed in a fluffing unit before being transferred to the drying unit 22, or alternatively, a rotary or fluidized bed dryer as the drying unit 22 may be utilized which may be capable of fluffing the material while it is dried, thereby avoiding the need for a separate form of the fluffing unit.

The drying unit 22 may be utilized to drive remaining moisture out of the treated feedstock materials. For example, a rotary drier, a fluff dryer, air drying or any other conventional drying process may be utilized to separate the majority of the remaining moisture in the treated feedstock fibers.

Figure 3:
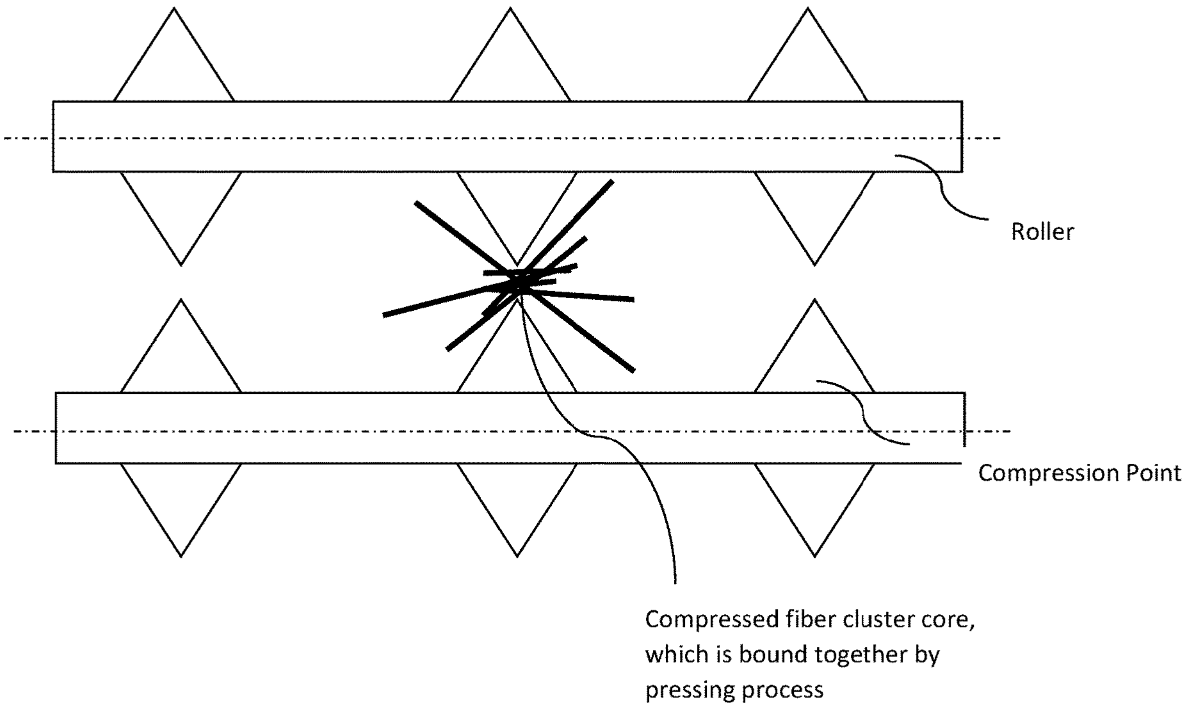
FIG. 3 shows an example of a mechanism that can be used to make a textured mat for forming fibers into superstructures, with a compacted core and then several protruding fibers in multiple directions, using rollers with pressure points.

During drying either in the drying unit 22 or in combination with the superstructure formation unit 24, the treated materials may be formed into a three-dimensional structure by a number of techniques. The materials may be dried on a conveyor to form a dry mat. The materials may be formed by rollers to form paper-like sheets or tubes. The rollers may be textured to provide specific qualities of the paper-like sheets, for example controlling the ratio of densified to undensified fibers. An example of such a roller configuration as an element of the superstructure formation unit 24 is shown in FIG. 3, in which nips 42 of rollers 40 pinch portions of groups of fibers 44 together while allowing others to remain spaced from one another and either dried or sized to remain of fixed superstructure configuration.

Alternatively, during or after drying, other materials may be added to the treated fibers in the superstructure formation unit 24, which may simply be a container, to promote bonding between the fibers. A sizing additive such as an adhesive may be used as a binding agent to bind fibers together into the three-dimensional superstructure. Similarly, a polymer spray may be applied to form links between fibers, that result in a strong three-dimensional matrix of fibers establishing the superstructures in random or organized form configured to establish fixed spacing between fibers of such clusters and thereby establish voids of the insulation. Finally, nanocellulose may be used to bind larger fibers together due to its extensive availability of sites and surface area for hydrogen bonding.

Following drying and superstructure formation, the treated materials may be fiberized in the fiberizing unit 26 to separate individual fibers as well as separating clusters of superstructures of fiber combinations. This may be accomplished utilizing a rotary fiberizer or disk refiner with plate gaps of various distances that are tuned to optimize the performance of the finished cellulose insulation.

Following fiberization, the materials may be classified using the fiber classifier 28, which may be a screening system or an air system or a combination of a screening and an air system. The purpose of such a classification is to separate high density materials, such as individual fibers packed relatively close together, from lower density materials, such as the clusters of superstructures of fiber groups, to control and make selectable based on combinations of such high and low density groups, the resultant overall bulk density of the insulation product to be installed in place, such as by blowing it in place. The use of a classifier allows the finished product to meet desired insulation requirements, even when utilizing a short fiber feedstock, such as SFR as well as other feedstock materials that may be used, either alone or in combination with SFR. It should be understood that the use of a classifier may be advantageous in some instances, but may not be required for certain applications.

Figure 4:
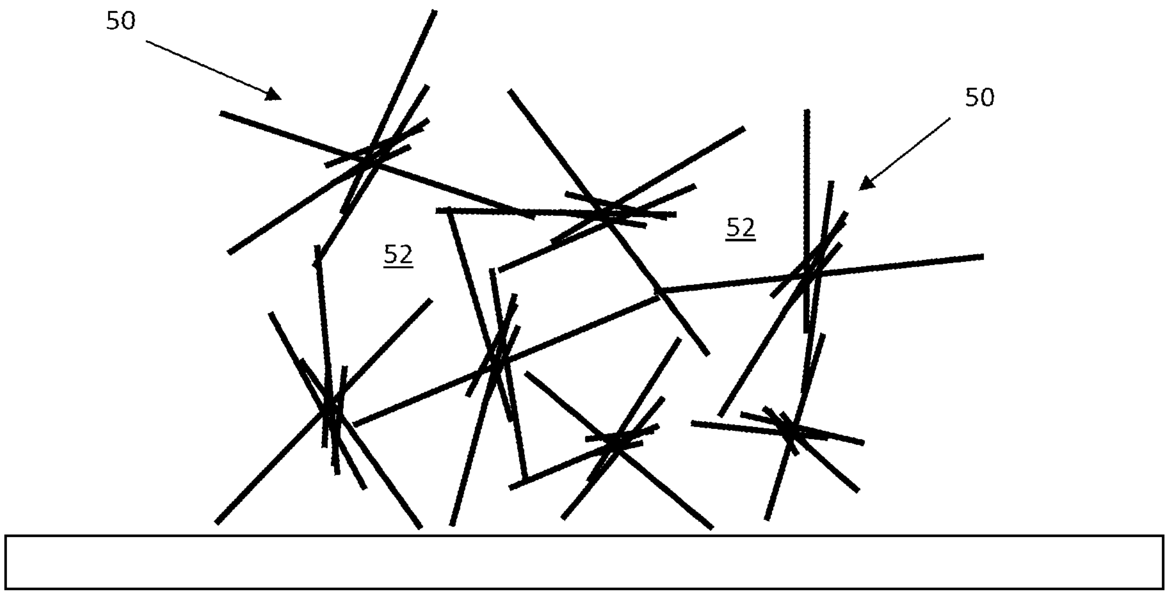
FIG. 4 shows how the protruding fibers of individual superstructures separate adjacent superstructures from one another.

FIG. 4 shows a simplified representation of the way formed superstructures 50, when stacked together, produce pockets or voids 52 that remain fixed in place after collection and after the insulation formed therewith has been installed. In FIG. 4, each of the clusters of fibers represents a superstructure, with fibers of a particular cluster being permanently joined together to form the superstructure shown.

FIG. 5 shows a simplified representation of how the presence of superstructures can reduce the density of a blended material containing superstructures and individual fibers. In this illustration, all superstructures are shown as clusters of crossing straight heavy lines and individual fibers are shown as lighter curved solid lines. (It should be understood that this is for illustration purposes and all fibers may have straight or curved sections.) The presence of the superstructures has two effects: first, superstructures tend to fall on top of one another reducing the density of the resulting bulk material; and secondly, the individual fibers tend to drape over superstructures. This allows that the void fraction of the insulation of the present invention is at least 30%, with the superstructures contributing voids to the overall matrix and helping to separate other individual fibers that may not be permanently affixed to any superstructure.

Figure 6:
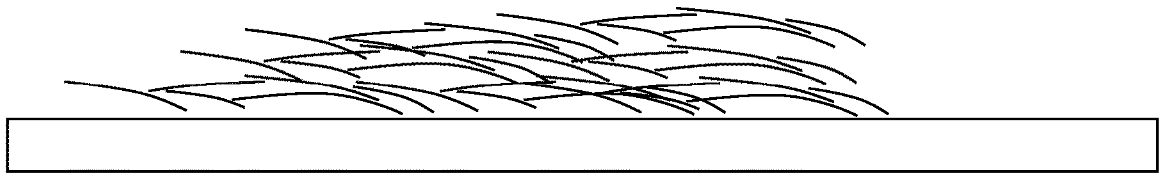
FIG. 6 shows how individual fibers without superstructures present can settle into a more densely packed configuration in an insulation of the prior art without superstructures.

FIG. 6 shows the problem of high density with short fibers using conventional insulation production methods in a prior art insulation that has no superstructures to maintain fixed voids. The fine fibers tend to fall into alignment and to stack more densely than when superstructures are present to separate the fibers.

Materials that may be purged out of the finished product stream during classification can be fed back into the process in upstream steps. For example, cellulose that was too dense for finished product may be reintroduced in advance of the matting step and may be usable when matted with other fibers in a second cycle. This reuse of materials after classification is doubly important in first allowing SFR to be usable as a feedstock and secondly in allowing the expensive fire retardants to be recovered in the process.

The resulting product may then be packaged for distribution using the collection unit 30.

In addition, it may be advantageous to combine the teachings from this disclosure with the teachings from prior patent grant U.S. Pat. No. 8,043,384, which teaches how to utilize a variety of feed stocks for manufacturing cellulose insulation. In that process, a feedstock may be utilized that incorporates a bonding agent, which may be present in old corrugated cardboard.

In applying the information of this disclosure, the SFR materials may be advantageously mixed with OCC, DLK, ONP, fluids and/or fiber materials recovered from other process stages or other materials at various steps in the process, which may include:

a) Mixing the SFR materials with other materials prior to treatment with a fire retardant blend (for example between steps {a} and {b} above)
b) Mixing the SFR materials with other materials after cleaning (between steps {b} and {c} above)
c) Mixing the SFR materials with other materials after treatments (between steps {c} and {d} above). In this case, the SFR materials may be treated for a different amount of time or under different conditions than the other materials and may have a higher or lower content of fire retardant materials than the other materials.
d) Mixing the SFR materials with other materials after any other subsequent stage of processing, providing that a mix of materials is ultimately provided in a bagging operation that includes the SFR materials and other materials.
e) Mixing SFR materials that may be moist with other materials that may be dry, or vice versa, in order to allow the dryer of the two materials to wick moisture away from the wetter material, or to suppress dust that may be produced by the dryer material.

Finally, it may be advantageous to pursue an alternative process for the production of these materials that involves mixing the chemicals that provide fire retardancy into the SFR while the SFR and/or other feedstock materials is semi-dry, rather than mixing it into the slurry pulp (which is almost all water). In that case, alternative means of mixing may be utilized, such as a ribbon mixer.

The present invention of a method for providing an improved fire retardant material and a cellulose insulation having a plurality of superstructures thereof that can be blown in place have been described with respect to specific components and method steps. Nevertheless, it is to be understood that various modifications may be made without departing from the spirit and scope of the invention. In particular, it should be understood that any reference to the use of SFR as a feedstock could be equally well applied to other fiber residuals with similar properties from other sources. All equivalents are deemed to fall within the scope of this description of the invention as identified by the following claims.

What is claimed is:

1. A cellulose-based insulation that can be blown into place comprising a plurality of cellulose fibers, wherein at least a portion of the plurality of cellulose fibers are short fiber residuals of which at least a portion of the short fiber residuals are fixedly joined together by chemical bonding between the at least a portion of the short fiber residuals to form a plurality of individual superstructures as three-dimensional bodies, wherein the plurality of individual superstructures form compression-resistant voids, and wherein a void fraction within the superstructures is at least 30%.

2. The insulation of claim 1 wherein the void fraction within the superstructures is at least 30% after blowing the insulation into place.

3. The insulation of claim 1 wherein at least a portion of the cellulose fibers are obtained from recyclable cellulose materials other than short fiber residuals.

4. The insulation of claim 1 wherein the cellulose fibers are treated with fire retardancy material.

5. The insulation of claim 4 wherein the fire retardancy material is a borate, magnesium sulfate or a combination of the two.

6. A fire resistant cellulose insulation comprising a plurality of cellulose fibers that can be blown into place, wherein at least a portion of the cellulose fibers are short fiber residuals, and wherein the fire resistant cellulose insulation is made by:

cleaning the plurality of cellulose fibers;

treating the plurality of cellulose fibers with one or more fire retardancy materials;

partially dewatering the fire retardant treated cellulose fibers;

drying the fire retardant treated and partially dewatered cellulose fibers; and forming a plurality of individual superstructures from at least a portion of the short fiber residuals of the fire retardant treated, partially dewatered and dried cellulose fibers, wherein the at least a portion of the fire retardant treated, partially dewatered and dried short fiber residuals are fixedly joined together by chemical bonding to form the plurality of individual superstructures as three-dimensional bodies, wherein the plurality of individual superstructures form compression-resistant voids, and wherein a void fraction within the superstructures is at least 30%.

7. The insulation of claim 1 wherein the chemical bonding includes hydrogen bonding.

8. The insulation of claim 6 wherein the chemical bonding includes hydrogen bonding.

9. A cellulose-based insulation that can be blown into place comprising a plurality of cellulose fibers, wherein at least a portion of the plurality of cellulose fibers are short fiber residuals and wherein at least a portion of the short fiber residuals are fixedly joined together with a binding agent to form a plurality of individual superstructures as three-dimensional bodies, wherein the plurality of individual superstructures form compression-resistant voids, and wherein a void fraction within the superstructures is at least 30%.

10. The insulation of claim 9 wherein the binding agent is a resin, a sizing agent, a chemical reagent, or any combination of the resin, the sizing agent, and the chemical reagent.

11. A fire resistant cellulose insulation comprising a plurality of cellulose fibers that can be blown into place, wherein at least a portion of the cellulose fibers are short fiber residuals, and wherein the fire resistant cellulose insulation is made by:

cleaning the plurality of cellulose fibers;

treating the plurality of cellulose fibers with one or more fire retardancy materials;

partially dewatering the fire retardant treated cellulose fibers;

drying the fire retardant treated and partially dewatered cellulose fibers; and forming a plurality of individual superstructures from at least a portion of the short fiber residuals of the fire retardant treated, partially dewatered and dried cellulose fibers, wherein the at least a portion of the-fire retardant treated, partially dewatered and dried short fiber residuals are fixedly joined together by adding a binding agent when the fibers are in a moist state which provides chemical bonding when dried to form the plurality of individual superstructures as three-dimensional bodies, wherein the plurality of individual superstructures form compression-resistant voids, and wherein a void fraction within the superstructures is at least 30%.

12. The insulation of claim 11 wherein the binding agent is a resin, a sizing agent, a chemical reagent, or any combination of the resin, the sizing agent, and the chemical reagent.

13. The insulation of claim 11 wherein the void fraction within the superstructures is at least 30% after blowing the insulation into place.

* * * * *